May 9, 1939.  F. H. LAMB  2,157,711
TRACTOR
Filed May 11, 1935  6 Sheets-Sheet 6
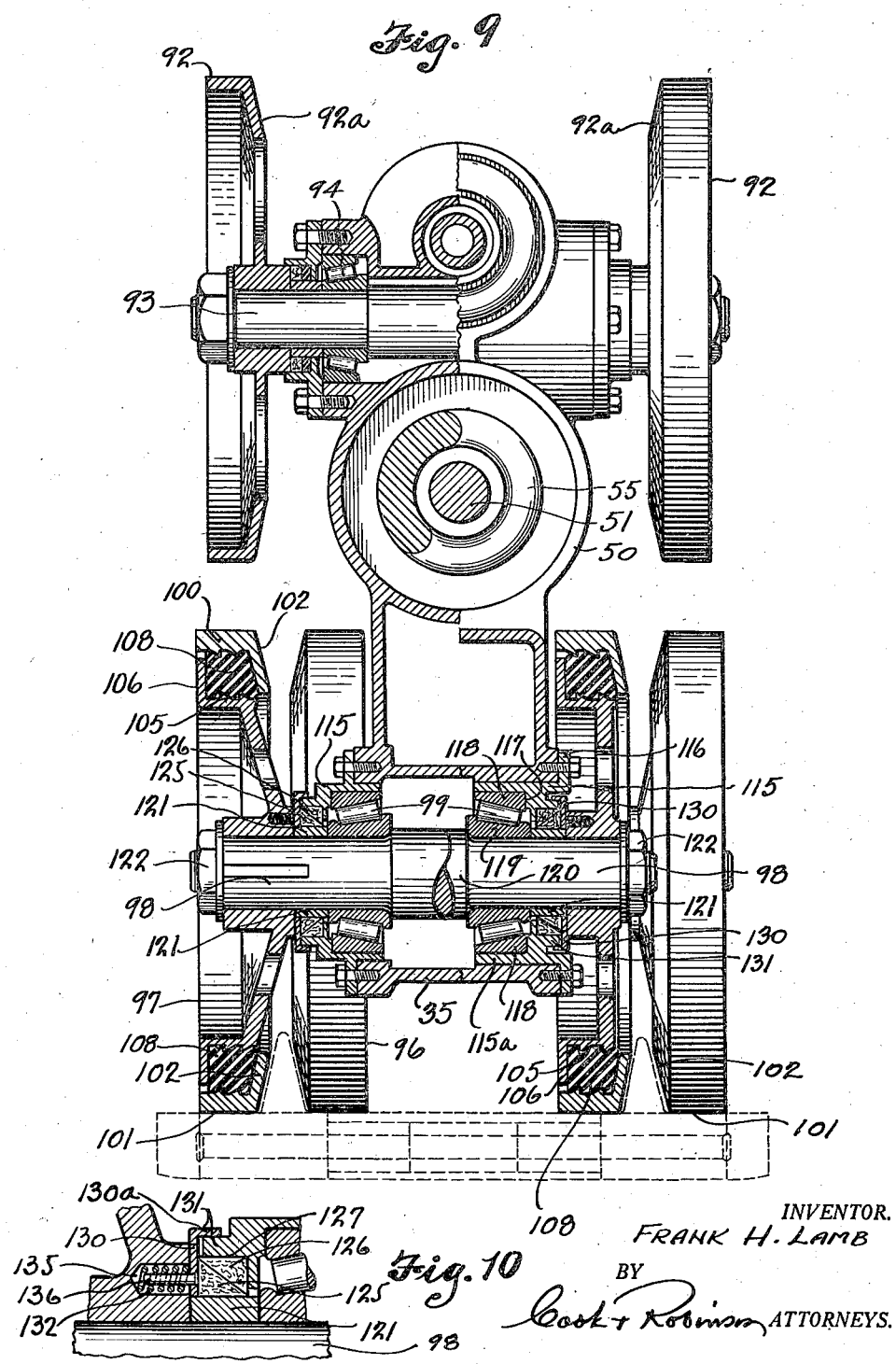
INVENTOR.
FRANK H. LAMB
BY
Cook + Robinson ATTORNEYS.

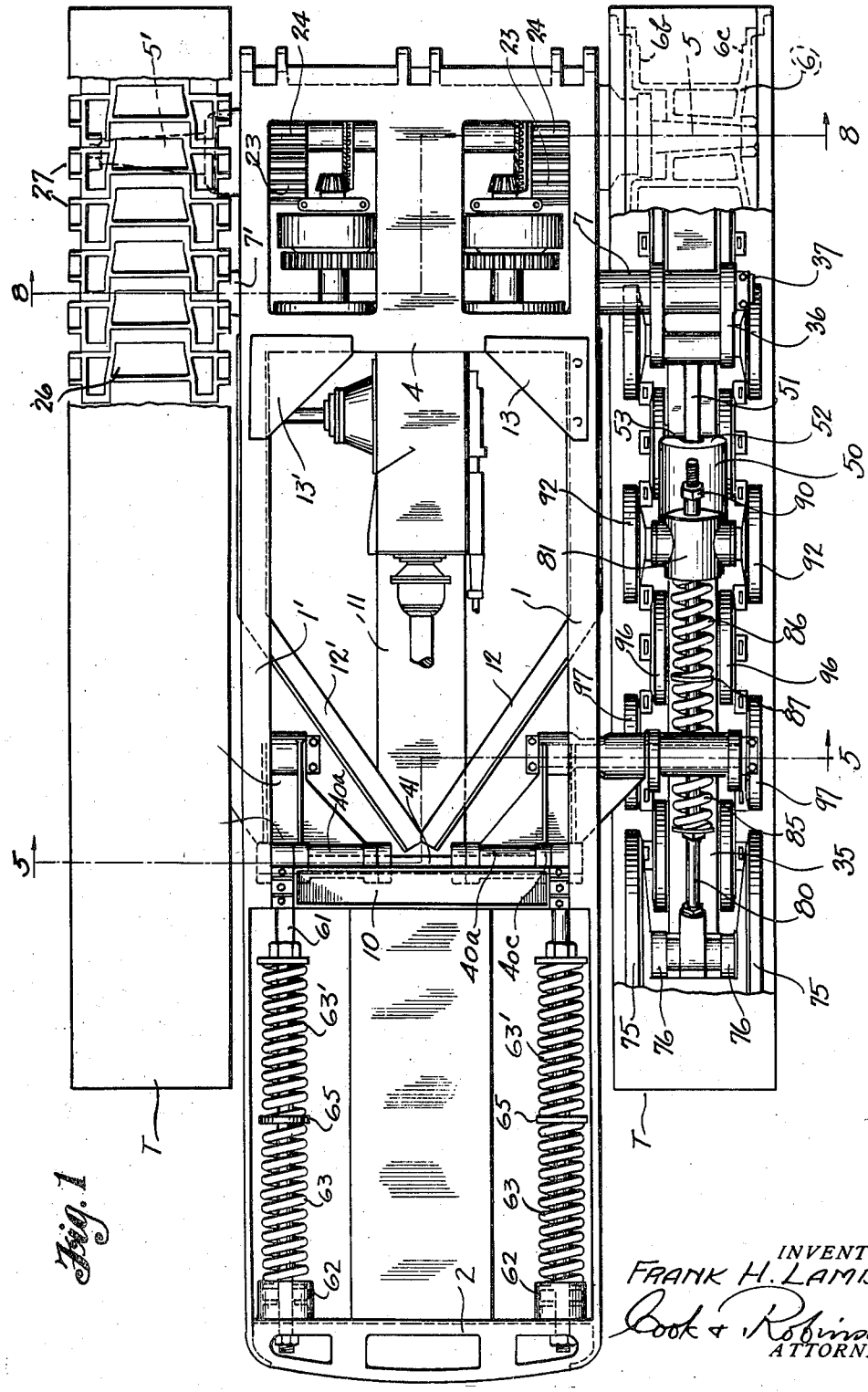

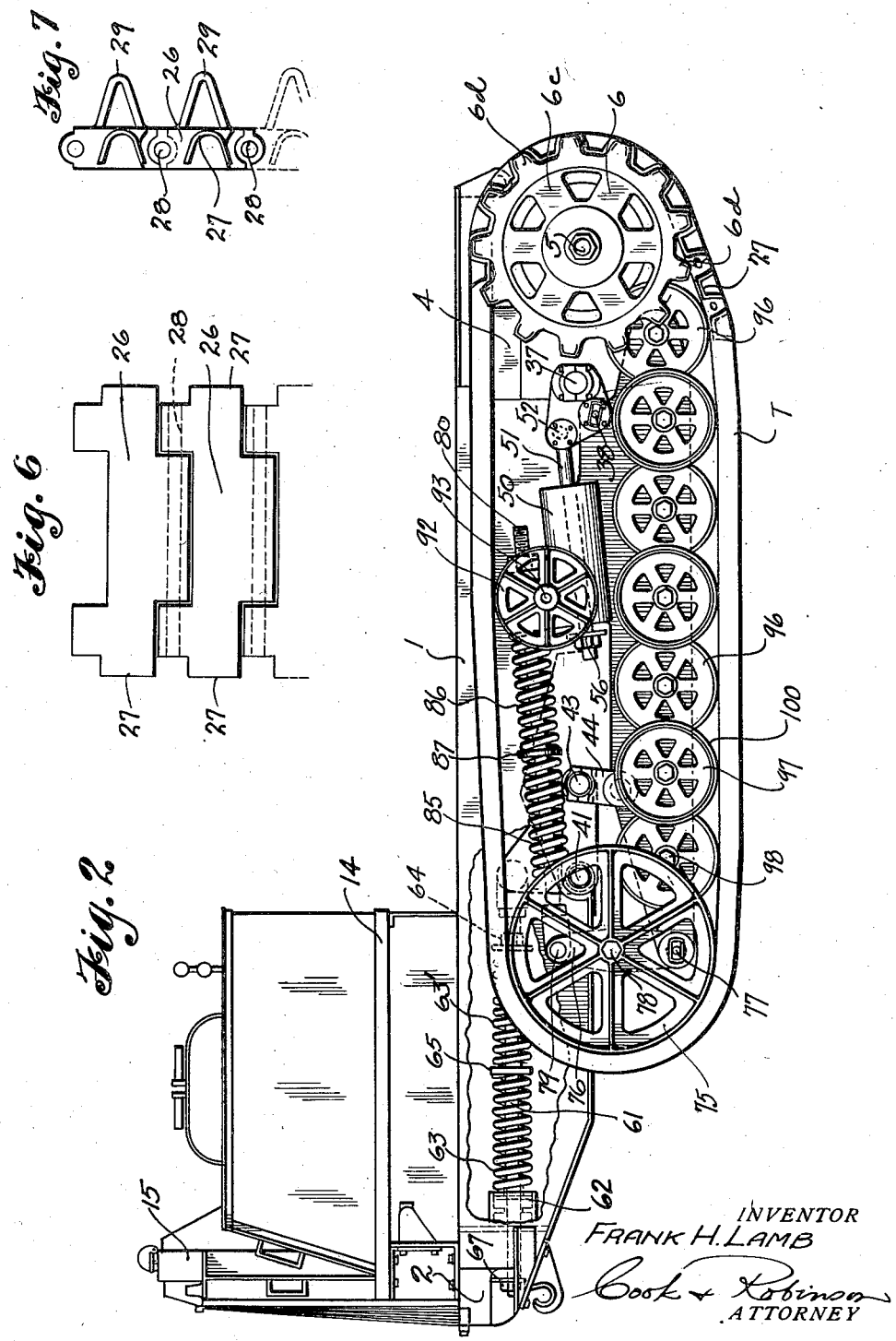

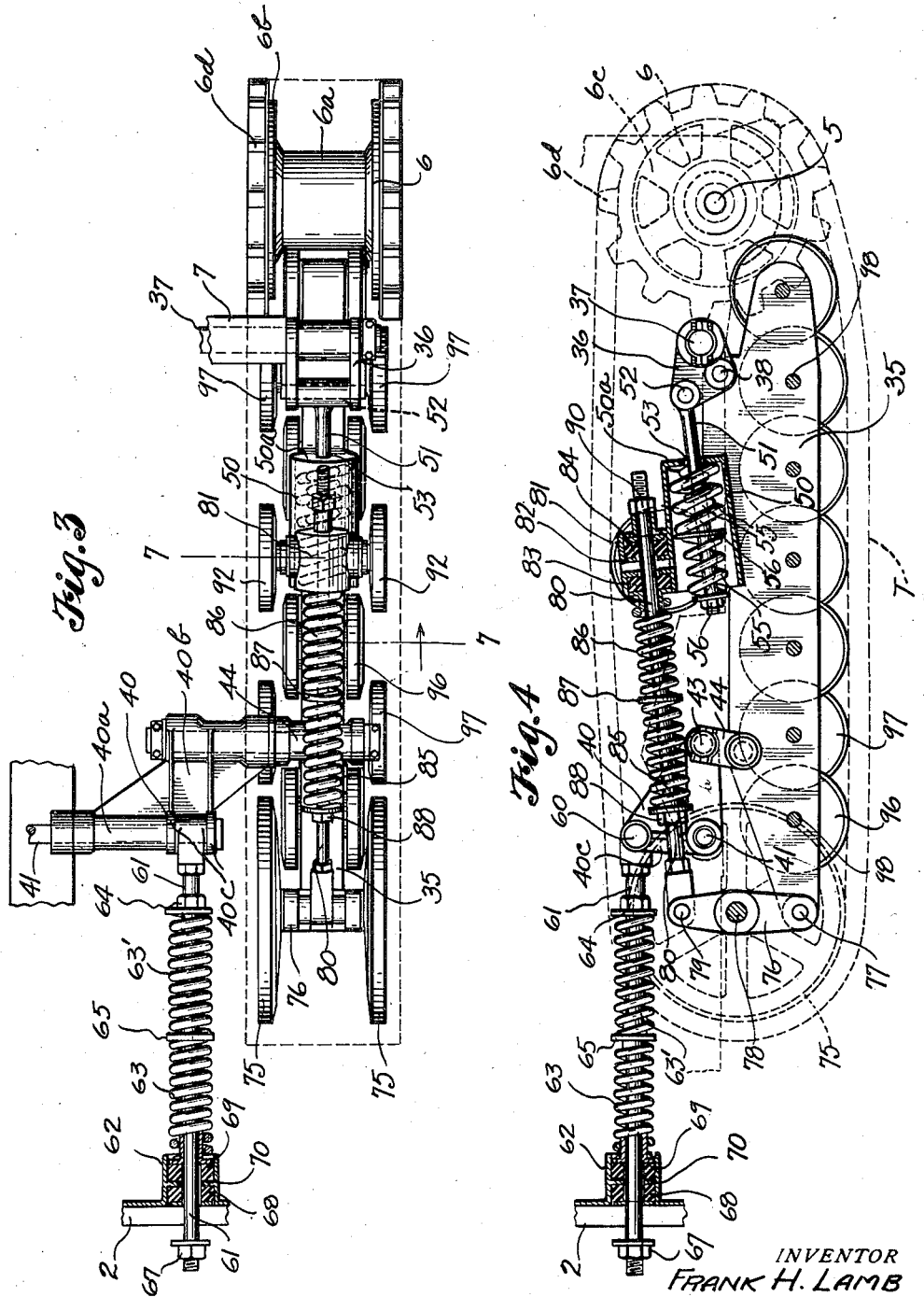

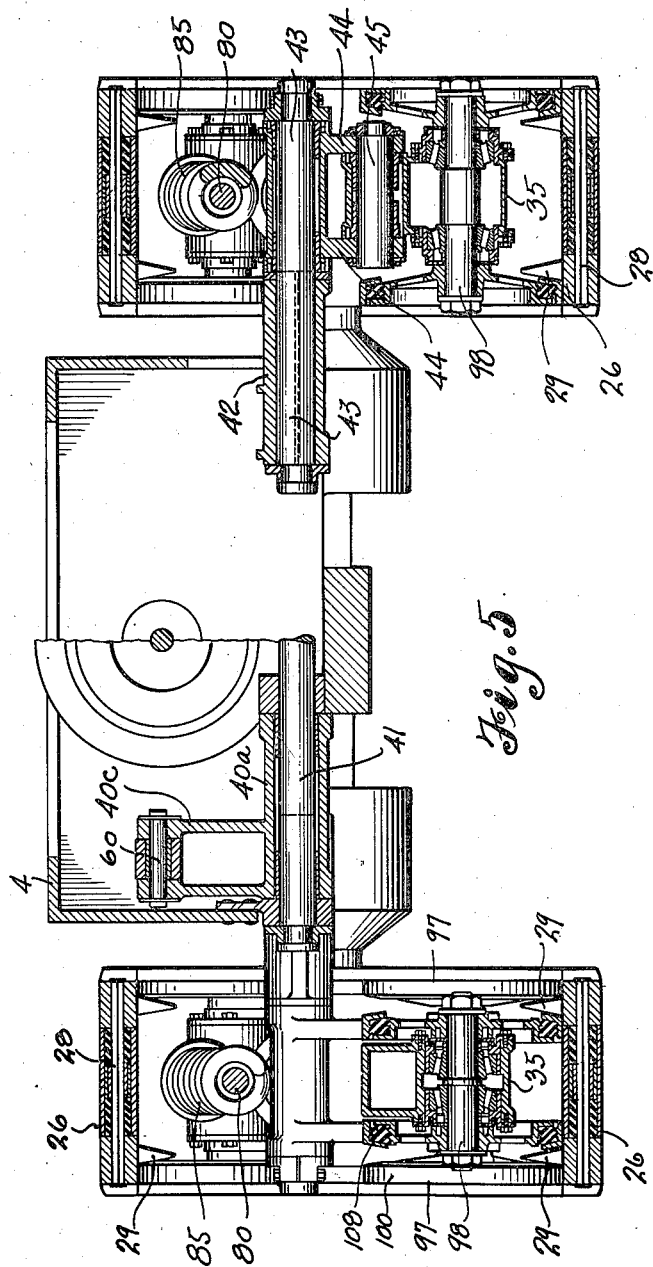

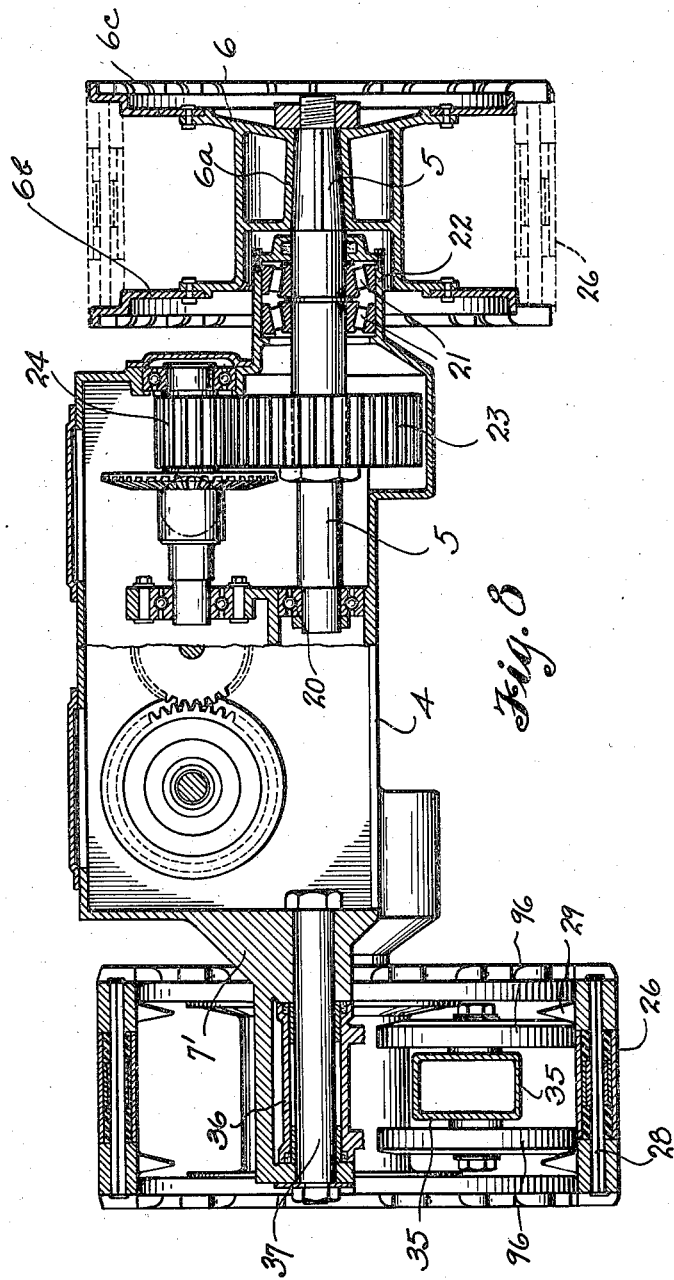

Patented May 9, 1939

2,157,711

UNITED STATES PATENT OFFICE 2,157,711

TRACTOR

Frank H. Lamb, Hoquiam, Wash.

Application May 11, 1935, Serial No. 20,954

3 Claims. (Cl. 180—9.1)

This invention relates to improvements in tractors, and it has reference more particularly to tractors of the crawler, or self-laying track types; for example, that type of tractor disclosed in United States Patent No. 1,997,000, issued to me on April 9, 1935; it being the principal object of this invention to provide an improved spring suspension for the crawler track mounting frames whereby shock, wear, vibration and strain to which the tractor may be subjected incident to normal or abnormal use, or to travel over rough or hard surfaced highways and roads, is absorbed to a maximum extent, thereby to materially lengthen the life of the tractor and especially of those parts subjected to shock.

Other objects of the invention reside in the details of construction, and in the combination of parts embodied in the invention, and in their mode of operation, as will hereinafter be fully described.

In accomplishing these, and other objects of the invention, I have provided the improved details of construction, the preferred forms of which are illustrated in the accompanying drawings wherein—

Fig. 1 is a plan view of a tractor having track frames at opposite sides equipped with spring suspension means and cushioned track mounting idler wheels in accordance with the objects of the present invention; a portion of the track at one side being broken away for better illustration of its mounting frame and idler wheels.

Fig. 2 is a side view of a tractor embodying the present spring suspension means; a part of the main frame of the tractor being broken away for better illustration of an enclosed spring suspension.

Fig. 3 is a top, or plan view, of one of the track frames, and its spring suspension means.

Fig. 4 is a side view of the same parts.

Fig. 5 is a cross section, in a vertical plane, as observed on the line 5—5 in Fig. 1.

Fig. 6 is a detail of the track construction illustrating the hinging of adjacent track shoes.

Fig. 7 is a side view of connected shoes of the track.

Fig. 8 is a cross sectional view, on the line 8—8 in Fig. 1.

Fig. 9 is an enlarged, cross sectional view in a vertical plane through the track supporting frame, as seen on the line 9—9 in Fig. 3.

Fig. 10 is an enlarged sectional detail of the oil seal.

In the present instance, the tractor has been designed for high speed travel, and in addition, it is a cargo carrier to the extent of practically its own weight. It is therefore evident that conventional tractor suspension would not be satisfactory under these conditions. Therefore, I have adopted and incorporated in this construction a four point arm suspension operating through coiled springs with supplementary aids for reducing vibration or frequency. The major portion of the equalization is effected through two front supporting arms. The ratio of maximum equalization as between the front and rear is about one to four. The total spring and arm action of the rear suspension is approximately 4 inches on a side. That of the front is about 16 inches. The result is that there may be as much as 20 inches difference in the level of the road for each track in the track center distance of 9 feet, or a difference of grade of 18½% or a grade angle of 10° 29'. Thus, the present equalization is a floating equalization effected at four points, two on each side of the tractor, and two each for front and rear. To my knowledge, no other tractor provides equalization at the rear end, and it should here be noted that in the present instance, front end equalization is effected by vertical oscillation of the front end of the track frame, the same as in other tractors, and rear end equalization is effected by changing the distance of sprocket center above the line of the bottom of the track belt. This construction relieves the sprocket of much of the strains due to inequalities of road surface.

In the present illustrations, I have shown a type of tractor which is known as a "cargo hauling" type, in which a clear space is provided on the main frame structure for mounting a body for carrying a load, or which may be used for the mounting of other mechanisms to be used for various purposes; for instance, a dumping body or a log handling boom. The present invention is not concerned to any material extent to what special purpose the tractor shall be put, however, it is more especially applicable to tractors doing heavy duty such as is required in road building operations and hauling of heavy loads.

Referring more in detail to the drawings—

The main frame of the present tractor is of a fabricated construction, and it comprises the longitudinal, opposite side frames 1 and 1' which, at the forward end of the tractor, are rigidly joined by a transverse frame structure 2, and at their rearward ends are rigidly secured by riveting, or otherwise, to the opposite side walls of a cast steel housing 4, utilized for enclosing the power transmission gearing, and from the opposite side walls of which housing extends the aligned axles 5 and 5', which, respectively, mount the track driving sprocket wheels 6 and 6', and brackets 7 and 7' for attachment of the track frame mounting shackles, presently to be described.

At a point approximately medial of the cross frame 2 and the housing 4, the side frames 1 and 1' are rigidly joined by a transverse frame structure 10, and there is a central longitudinal bottom plate 11 extending from the lower edge of the frame 10 to the under side of the transmission housing 4, and angle iron brace bars 12 and 12' are joined to the plate 11 near its point of connection with the frame 10, and are extended rearwardly and laterally to opposite sides where they are jointed with the frames 1 and 1'. Triangular web plates 13 and 13' are applied to the frame at the junction of the side frames 1 and 1' with the housing 4 to add strength and rigidity to the connection.

The construction of the various parts of the main frame structure of the tractor which includes the transmission housing 4 as a part thereof, and the manner of joining the various parts together is such that a perfectly rigid frame is provided on which may be mounted the equipment intended, and which will adequately withstand all the stresses and strains that are required of it in its use.

The prime mover for the vehicle may be an engine of any suitable kind, and is not herein illustrated. However, the engine employed in the present construction is to be mounted within the forward end portion of the frame structure between the cross frames 2 and 10. In Fig. 2 I have illustrated the frame as being equipped with a platform or cab 14 for the convenience of the operator. Also, I have designated at 15, the cooling radiator for the engine.

The transmission mechanism through which direction of travel and speed of the vehicle is controlled, may be of any suitable type of construction, and has not been illustrated in detail. It is thought sufficient to explain that it is operatively connected with the engine and provides a connection through which may be obtained a plurality of different forward and reverse driving speeds for the track driving axles 5 and 5'. Also, it is intended that adequate control means be provided either for driving these axles in unison or at different speeds for steering of the vehicle; such control means being illustrated and described in the pending application of G. E. Lamb, filed on March 5, 1934, under Serial No. 714,029, now Patent #2,088,110, dated July 27, 1937.

By reference to Fig. 1, it will be observed that the track driving axles 5 and 5' are in axial alignment transversely of the housing 4 and each is rotatably mounted at its inner end, as seen in Fig. 8, in a supporting bearing 20, carried in a part integral with the housing 4, and its outer end is rotatably supported by bearings 21 fitted within a cylindrical hub 22 that is cast as a part of, and extends outwardly from the corresponding side wall of the transmission housing. A driving gear wheel 23 is keyed on each shaft 5 and 5' within the housing 4 and on the outer ends of these shafts, which extend beyond the hubs 22, are mounted the sprocket wheels 6—6', previously mentioned. The gears 23 operate in mesh with driven gears 24, which are a part of the transmission mechanism.

It will be understood by reference to Figs. 1, 3 and 8, that each sprocket wheel 6 and 6' comprises a hub portion 6a that is keyed to the tapered end of its mounting shaft 5 or 5', and integral with this hub, or secured thereto by suitable means, in spaced, coaxial relation, are wheel flanges 6b and 6c, which are equipped with sprocket teeth 6d, which provide a means of effecting a positive driving connection with the track belt which operates thereover.

It will here be explained that the preferred construction of the crawler tracks to be used with the present tractor are composed of a plurality of hingedly joined track shoes 26, and that each of the shoes is provided at its ends with extended lugs 27 adapted, incident to travel of the endless track belts about the sprockets, to engage between the sprockets 6d to effect a driving connection. As illustrated in detail in Fig. 6, adjacent track shoes 26 are connected by transverse hinge pins 28, and on the inside surfaces of each shoe, near its opposite ends, are inwardly extending tapered lugs 29, which are adapted during travel of the track, as presently understood, to engage with idler wheels to prevent lateral displacement of the track from its intended line of travel.

A preferred construction of the crawler track would correspond to that described and illustrated in detail in the United States Patent No. 1,973,214, issued to me on September 11, 1934, although it is to be understood that the invention need not be confined to tractors using this particular type of track.

At each side of the tractor frame, extending parallel therewith, and aligned with the track driving sprocket wheel at that side, is a track frame which is suspended from the main frame through the mediacy of spring suspension means embodied by the present invention. Each of the track frames comprises an elongated, hollow beam 35 that is disposed horizontally as a supporting and guiding means for the endless track belt at that side.

At its rearward end, each of these track frame beams 35 is operatively attached to the main frame of the tractor through the mediacy of a bell crank in the form of a triangular shackle block 36. Each bell crank 36 is pivotally mounted to oscillate about one angle thereof on a pin 37 mounted, as seen best in Fig. 8, within the bracket 7 or 7', extended laterally from that side of the housing 4. Each bell crank has a forwardly and downwardly directed leg provided at its end with a hinge pin connection, as at 38, with the adjacent end of the corresponding beam 35. The hinge pin 38 is forward of and slightly lower than the hinge pin 37 and parallel therewith, thus permitting of an appreciable vertical movement of this end of the beam relative to the pin 37, and incidentally, relative to the adjacent sprocket wheel 6 or 6'.

At its forward end, each of the track frame beams 35 is operatively attached to the main frame of the tractor through the mediacy of a bell crank shackle 40. Each shackle is pivotally mounted within the main frame adjacent a side beam, as seen in Fig. 1, on a transversely supported shaft 41; the shaft being fixedly supported at its ends from the side beams of the main frame, as is illustrated in Figs. 1 and 5. Each bell crank 40 comprises an elongated hub portion 40a, revolubly fitted on the supporting shaft and formed with a lever arm 40b extended outwardly and rearwardly, which arm, at its end, mounts a pivot axle 43 that horizontally and transversely overlies the forward end portion of the frame beam 35 at that side, and is attached thereto by a vertically disposed link 44 which has its opposite ends pivoted on the pin 43 and on a pin 45, extended through the track beam, as seen in Fig. 5.

Cast integrally with each of the track frame beams 35, and on its top edge at a suitable distance forwardly of its associated bell crank 36, is a cylindrical housing 50 closed at one end by a substantially vertical rear end wall 50a, and open at its forward end, as seen in Fig. 4. A link, or rod 51, is pivotally connected at its rear end to the upper, forward corner of the bell crank by a pivot pin 52, and extends forwardly and coaxially within the housing 50 through a hole 53 in the end wall 50a. Surrounding the rod, and located within the housing are suitable compression springs 55, retained on the rod by a nut 56 at its end, and held under compression by the nut and end wall of the housing. The arrangement as described, and as shown in Fig. 4, provides that the weight of the tractor, as applied to this spring mounting, acts downwardly on the pin 37, thereby to tend to rotate the bell crank 36 clockwise about the pivot pin 38, thereby to transmit this weight to the springs 55 to compress them, but which are of such strength that they will adequately support the vehicle under all conditions of use.

In a preferred arrangement, three springs 55 would be employed and arranged as in Fig. 4, which shows a spacer 56 slidable on the rod between two coextensive springs at one side thereof, and a single spring at the other side; these three springs being graduated in strength for reasons well understood.

Each of the forward bell cranks 40 has an upwardly directed arm 40c integral with its hub portion. Pivotally connected to this arm by pivot pin 60, is a link, or rod, 61 extended horizontally and forwardly through a guide housing 62 attached to the cross frame 2 at the forward end of the main frame, as seen in Fig. 1. Surrounding each rod 61 are coiled springs 63—63' placed end to end, and seated at their outer ends, respectively, against the housing 62, and a nut 64 on the rod near the bell crank connection. A spacer and seating member 65 is slidable on the rod between the inner ends of the springs. Thus the springs are held under compression to sustain the weight of the tractor applied through the bell crank 40; it being understood that weight applied downwardly through the bell crank from the pivot shaft 41 will be sustained by the pivotal connection with the track beam provided through the link 44, and this will tend to rotate the bell crank in a counterclockwise direction, and thus place the springs 63 under compression.

The forward end portions of the rods 61 are slidable through the housings 62, and have nuts 67 fixed on their forward ends, and there are rubber cushioning pads 68 and 69 fitted in the housing at opposite sides of a partition, or web, 70 through which the rod 61 slidably extends. Thus, shock, vibration, or impact transmitted through the springs will be received by the rubber pad 69 and jar or shock caused by any rebound will be absorbed by the pad 68 when it is engaged by the nut 67.

The tracks, each of which is designated in its entirety by reference character T, is an endless, link belt which operates about the sprocket wheel 6 or 6', and about paired wheels 75—75 rotatably supported at the forward end of the track frame beam 35 by a pair of vertically disposed links 76—76, which, at their lower ends, are pivotally fixed to the forward end of beam 35 by a pivot pin 77, and which, at a point intermediate their ends, mount a cross shaft 78 on which the wheels 75 rotate; the wheels being located at the outside of the links, and fixed as seen in Fig. 1.

At their upper ends, the links 76—76 are connected by a pin 79 with a rod 80 which extends rearwardly and slidably through a guide housing 81 cast integrally with and upon the housing 50. The housing 81 is provided with internal encircling shoulders 82 against which rubber pads 83 and 84 are seated, and through which pads the rod 80 slidably extends. Coiled springs 85 and 86 encircle the rod with their adjacent ends seated against a spacer 87, slidable on the rod, and their outer ends seated, respectively, against a nut 88 fixed on rod 80 near its forward end connection, and against the forwardly facing pad 83. A nut 90 is fixed on the rearward end of the rod to engage pad 84, to limit the expansion of the openings.

It will be understood from the above description, that the tendency of the coiled springs 85 and 86 to expand will maintain the track belt taut, and will take up any slack therein that results from wear on the joints.

The upper run of each of the track belts is supported by a pair of idler wheels 92—92, mounted on the outer ends of a cross axle 93 revolubly mounted in bearings 94 in a housing formed as a part integral with the housings 50 and 62, and these wheels are so spaced to support the belt by contact with the outer end portions of the track links. Also, these wheels have beveled inside flanges 92a to be engaged by the track shoe lugs 29, thereby to guide the track and prevent lateral displacement.

The lower run of each track belt is guided by and bears against a plurality of paired inner and outer sets of idler wheels mounted in even spacing along the length of beam 35; the wheels of the inner sets being designated by reference numerals 96—96 and the outer sets by 97—97.

The tractor is supported on that part of each track belt that underlies the plurality of sets of idler wheels carried by the track frame beams 35, and the suspension of the track frames is such that the driving sprocket wheels 6—6' will be normally elevated a few inches above the plane of the surface on which the tracks rest so that the spring suspension for that end of the tractor may properly function.

As will be observed by reference to Figs. 5 and 9, the wheels of each set are keyed on the opposite ends of transverse axles 98 extending transversely through the hollow beams 35, and revolubly supported in anti-friction bearings 99. Each of these wheels has a metallic tire 100 with a flat surface 101 to engage flatly with the inner surface of the track links, and it has an integral, beveled side flange 102, designed to be engaged by the sides of the tapered lugs 29 of the links to prevent lateral displacement of the track belt. It will be observed also that the wheels of the inner and outer sets are spaced in such manner that the track lugs 29 pass inside of wheels 97—97 and outside the wheels 96—96, and for this reason, the beveled side flanges of the inside wheels are faced outwardly and those of the outside wheels are faced inwardly, as observed best in Fig. 9.

A feature of this invention resides in the details of construction of the idler wheels, whereby they are cushioned to relieve them of shock and jar that is incident to impact in travel of the track shoes thereacross. Each wheel has a circular central body formed centrally with its mounting hub and about its periphery with an outwardly facing seat 105 upstanding flange 106 at one edge. Encircling the seat and flange and spaced therefrom, is the wheel tire 100, and interposed between the seat and tire, and also between the flange 101 of the tire, and flange 106 of the wheel body, is a rubber cushioning insert 108. The seat and tire are forward on their facing surfaces with deep angular grooves to receive the rubber, thus preventing its displacement therefrom. This particular provision of wheel cushioning means eliminates the destructive and damaging effect of road shock and impact, and thereby materially lengthens the life of the track frame assembly and its individual parts.

Another feature of construction is the improved type of oil seal about the idler wheel mounting axles. It will here be explained that the hollow beams 35 serve as oil reservoirs from which the bearings which mount the axles 98 are lubricated by the splash of oil. Suitable openings are provided in the beams for passing the axles therethrough, and these openings are normally closed by closure plates 115 which are fitted within the openings and which also mount the bearings 99 which support the axles. Each closure plate has a cylindrical portion 115a fitted in the opening, and it has an outer end flange 116 limiting its inward movement, and receiving mounting bolts. The cylindrical portion is formed with an encircling, internal shoulder 117 against which is seated the outer raceway 118 of the roller cage. The inner raceway 119 is seated against an encircling enlargement 120 on the axle, and is held in place by a collar band 121 fitted to the axle between the raceway and hub of the idler wheel, which wheel is held on the axle by a nut 122.

The oil seal means consists of two complemental rings 125—126 of granulated cork fitted respectively about the collar 121, and within an annular, outwardly opening seat 127 in the shoulder portion 117 of the closure member. These two rings are fitted together in an inwardly and conically tapered joint, as seen in Fig. 10, to provide an opposite wedging action whereby they are maintained tightly seated, and this wedging action is maintained by the pressure exerted inwardly against ring 125 by an overlying cup-like member 130 which is disposed between the sealing ring and the inner end of the wheel hub. By reference to Fig. 10, it will be observed that the plate or cup 130 has an inturned peripheral flange 130a slidably overlapping an annular flange 131 encircling the seat 120, and that there are a plurality of coiled springs 132 bearing inwardly against the cup, thereby to wedge the cork rings together. The springs are contained in sockets 135 bored in the wheel hub, and there are studs 136 on the plate extended into these sockets to cause the cup to revolve with the axle.

This arrangement of the oil seal provides a constant wedging action between the cork rings and a tightly maintained joint about the collar 121, and in the seat 127, and a tight end seal between the closure plate and cork seal. Furthermore, the present seal is secured not only on the revolving shaft, which is standard, but also upon one of the faces of the seal. Also, due to the placing of the spring and follow disk on the outside in connection with the wheel, there is no movement of the cork members in their seats in order to make up for wear on any endwise movement of the shaft. The cork can, therefore, be inserted tightly in its seat, or cemented in place if desired, and this will prevent any possibility of the seal turning, which is the cause of failure of many seals.

Briefly summarizing the advantages recited in the present construction, the first resides in the four point spring suspension for shock absorption. The front arm supports with their long springs produce a low frequency and high amplitude which is very desirable, since at this end is located the driver and the engine, both of which need to be relieved so far as possible of shock and vibration. At the rear end frequency is high and amplitude less, which likewise is the right balance for this end of the tractor since it would be structurally undesirable to have the sprocket transmission and rod subject to high amplitude. The rear end springs therefore are relatively stiff and have small movement, and in addition to the ability to equalize and absorb shock, the construction retains the tracks accurately and properly in alignment and against any tendency of toeing in or out.

In addition to the absorption of shock and vibration by the springs of the suspension means, the track idlers are cushioned by the rubber tire inserts. These absorb the high frequency minor vibrations which are so destructive. A particular part may be well within the allowable static stress, but the enormous repetition of minor shocks or stresses tends to destroy the material by what is imperfectly termed fatigue, with the result that the physical grain structure of the steel is changed and failure results. It is undoubtedly the small but frequent shocks that heretofore have been so destructive of the solid cast steel idler wheels used in earlier machines of this kind.

Having thus described my invention, what I claim as new therein and desire to secure by Letters Patent is—

1. A tractor of the crawler type having a rigid main frame, traction belt mounting frames disposed longitudinally of and at opposite sides of the main frame, traction belts mounted for travel about the said frames, sprocket wheels mounted on the main frame in operative engagement with the traction belts for driving the latter, and separate spring suspension means for forward and rearward ends of each traction belt mounting frame; each of the four suspension means being independent in operation of the others, and each comprises a bell crank pivotally mounted on the main frame and having pivotal connection with the adjacent end of the belt mounting frame to accommodate relative vertical movement of the latter, and springs mounted to act against the bell cranks to yieldingly sustain weight of the main frame through the bell crank connections with the track frames.

2. A tractor of the crawler type having a rigid main frame, transverse supporting shafts mounted in the main frame at opposite ends thereof, track belt mounting frames disposed to extend in parallel vertical planes along opposite sides of the main frame between said shafts, traction belts mounted by said frames for travel thereabout, sprocket wheels mounted on the main frame in operative engagement with said belts for driving them, bell cranks mounted for oscillating movement on the opposite ends of the said transverse shafts, each bell crank having a pivotal connection with the adjacent end of the belt mounting frame at that side to accommodate relative vertical movements of the latter, a spring mounting fixed on the tractor adjacent each bell crank and springs mounted thereby and connected with the corresponding bell crank in a manner to act on the latter to yieldingly sustain weight of the main frame, and to yieldingly resist rebound.

3. A tractor of the crawler type comprising a main frame, traction belt frames disposed longitudinally of the main frame at opposite sides thereof, traction belts operatively supported for travel about the said frames, means for driving the belts, and separate spring suspension means for forward and rearward ends of each frame; each of the four suspension means being independent in action of the others, and each comprising a bell crank lever pivoted on the main frame to oscillate in a vertical plane and having pivotal connection with the adjacent end of the track frame at that side to permit relative vertical movement of the latter, and resilient means for each bell crank supported to act against the bell crank in a manner to yieldingly sustain weight of the main frame and yieldingly resist rebound thereof.

FRANK H. LAMB.